US008335901B2

(12) United States Patent
Kawamura

(10) Patent No.: US 8,335,901 B2
(45) Date of Patent: Dec. 18, 2012

(54) INFORMATION PROCESSING APPARATUS AND DATA RESTORATION METHOD

(75) Inventor: Kazunari Kawamura, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/165,427

(22) Filed: Jun. 21, 2011

(65) Prior Publication Data

US 2012/0005413 A1  Jan. 5, 2012

(30) Foreign Application Priority Data

Jun. 30, 2010 (JP) ................................. 2010-150344

(51) Int. Cl.
*G06F 12/00* (2006.01)
(52) U.S. Cl. ................................. 711/162; 711/E12.103
(58) Field of Classification Search .................. None
See application file for complete search history.

(56) References Cited

U.S. PATENT DOCUMENTS

| 5,226,157 | A | 7/1993 | Nakano et al. | |
| 5,948,112 | A | 9/1999 | Shimada et al. | |
| 2007/0198791 | A1* | 8/2007 | Iwamura et al. | 711/162 |
| 2007/0271430 | A1* | 11/2007 | Maki et al. | 711/162 |
| 2008/0046646 | A1* | 2/2008 | Tamura et al. | 711/113 |

FOREIGN PATENT DOCUMENTS

| JP | 01-231150 | 9/1989 |
| JP | 03-269747 | 12/1991 |
| JP | 04-107725 | 4/1992 |
| JP | 06-019729 | 1/1994 |
| JP | 06-214883 | 8/1994 |
| JP | 09-244907 | 9/1997 |
| JP | 2000-122906 | 4/2000 |
| JP | 3072048 | 7/2000 |
| JP | 2001-109584 | 4/2001 |

OTHER PUBLICATIONS

Japanese Patent Application No. 2010-150344; Notice of Reasons for Rejection; Mailed Oct. 25, 2011 (English translation).

* cited by examiner

*Primary Examiner* — Edward Dudek, Jr.
*Assistant Examiner* — John P Fishburn
(74) *Attorney, Agent, or Firm* — Blakely, Sokoloff, Taylor & Zafman LLP

(57) ABSTRACT

According to one embodiment, an information processing apparatus includes a main memory, a first storage, a second storage, a first writing module, and a second writing module. A first storage is configured to store a file for executing an operating system. A first writing module is configured to write writing position information which indicates a writing position of data written in the second storage and is written to a predetermined position to the second storage, to the main memory. The second writing module is configured to write, to the first storage, the writing position information in the main memory to a predetermined write area in the first storage in a case of a crash of the operating system. The third writing module is configured to write the writing position information to the predetermined position in the second storage.

16 Claims, 7 Drawing Sheets

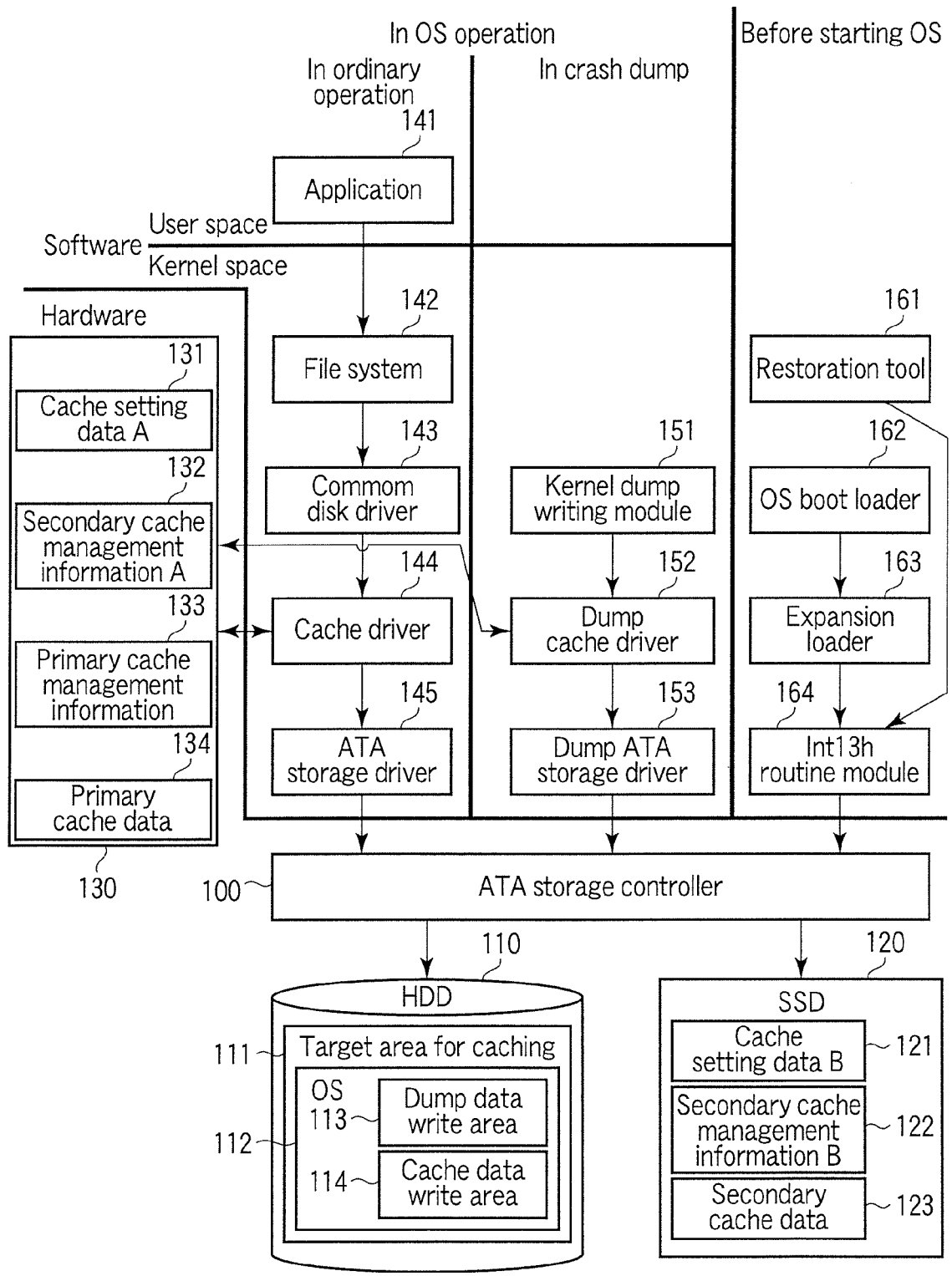
F I G. 1

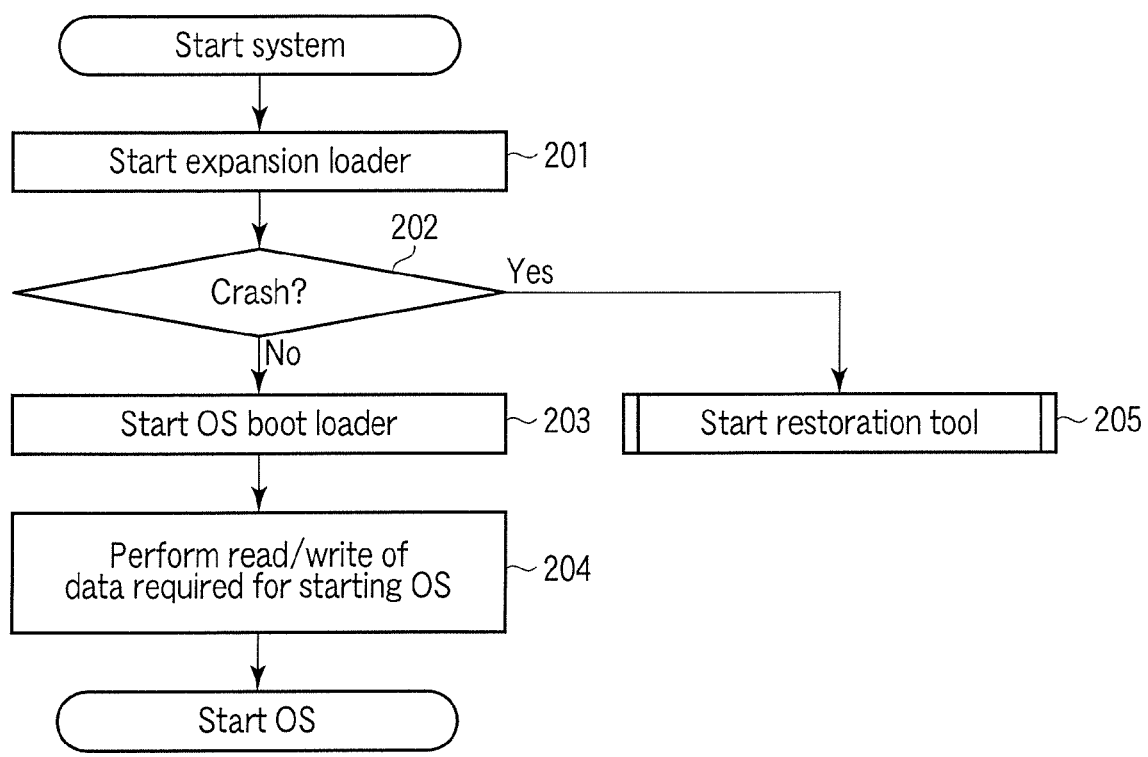
F I G. 2

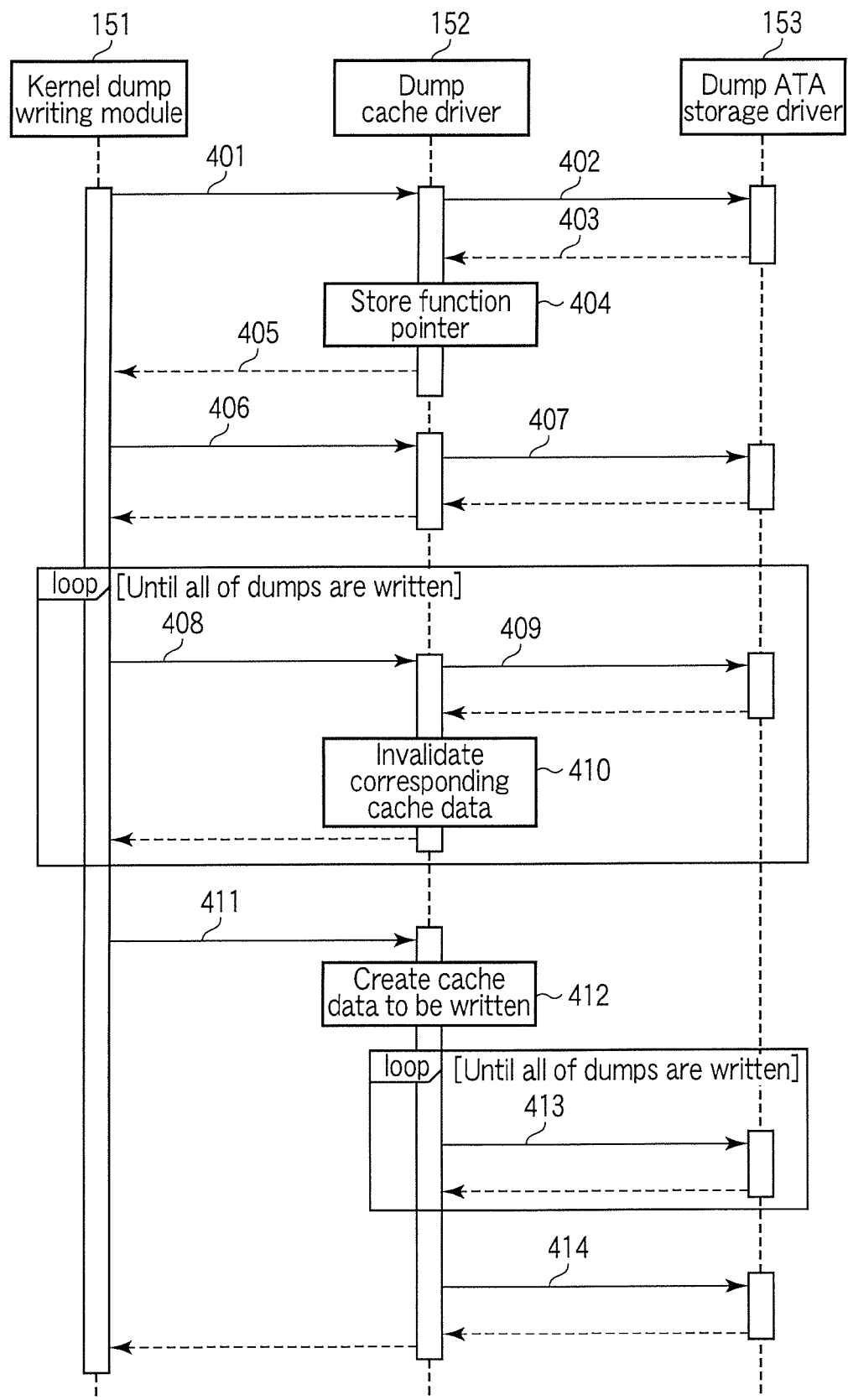
F I G. 4

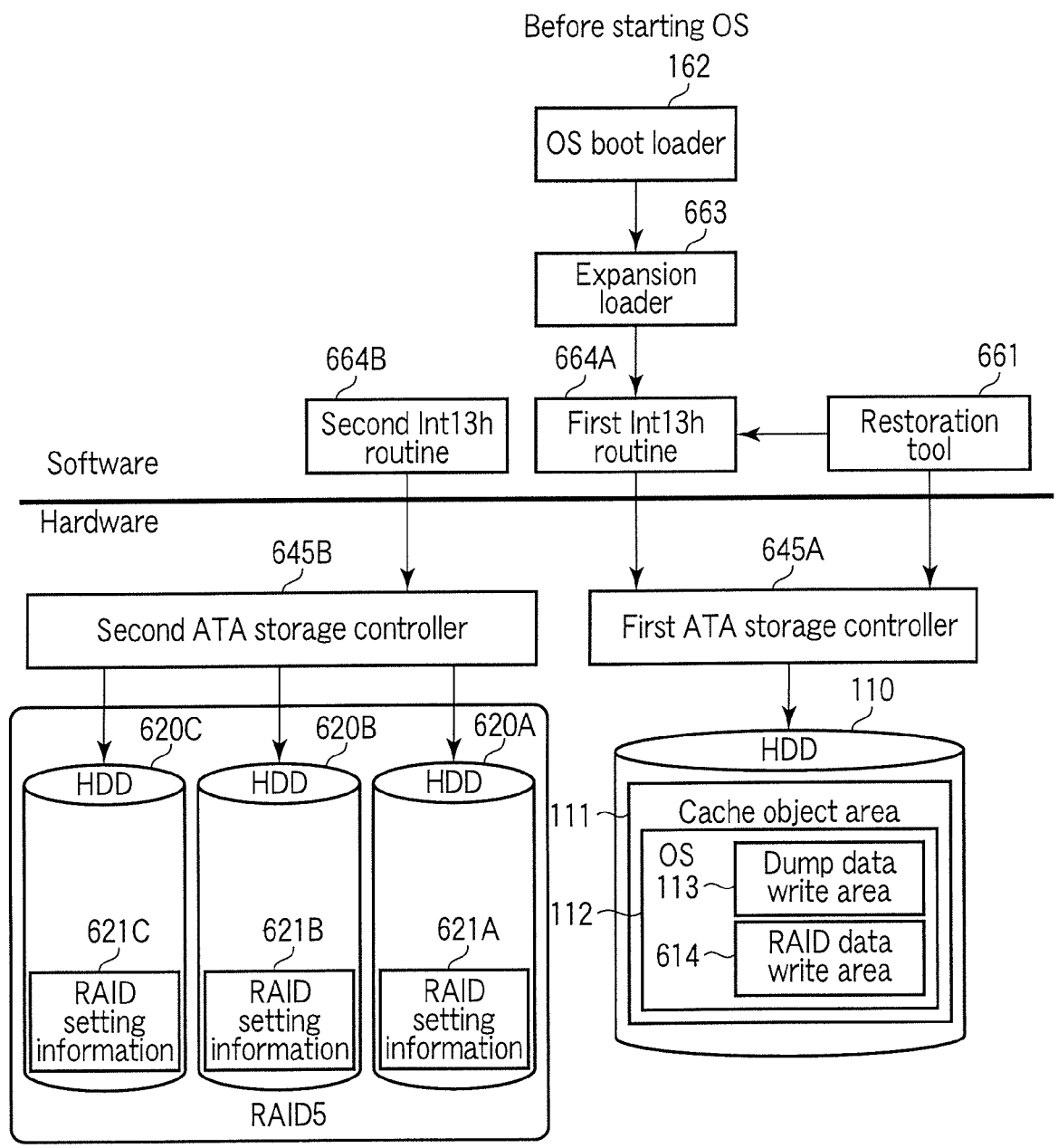
F I G. 7

INFORMATION PROCESSING APPARATUS AND DATA RESTORATION METHOD

CROSS-REFERENCE TO RELATED APPLICATIONS

This application is based upon and claims the benefit of priority from Japanese Patent Application No. 2010-150344, filed Jun. 30, 2010; the entire contents of which are incorporated herein by reference.

FIELD

Embodiments described herein relate generally to an information processing apparatus which restores data which are not written to a storage and a data restoration method.

BACKGROUND

A hard disk is slower in access as compared to a semiconductor memory. Accordingly, improvement in data access speed is attained by storing cache data to a main memory by using a part of the main memory as a target area for caching.

Also, a hybrid hard disk drive is known, in which a nonvolatile memory is mounted on a hard disk, and the nonvolatile memory is used as a cache memory.

Also, a computer to which an solid-state disk (SSD) which uses a nonvolatile memory as a storage medium is adopted in place of a hard disk drive has recently been marketed.

A system using a main memory and an SSD as caches is currently proposed. In the system, a driver is used for caching to the main memory and the SSD. However, in the case where a crash of an operating system occurs in a state where the caching to the main memory and the SSD is performed by the driver, there is a risk of losing the cached data. Therefore, since there is the risk of losing the cached data which are not written to a storage in the case of the crash of the operating system, there is a demand for a technology for restoring the cached data to the storage.

In order to attain data redundancy, a Redundant Array of Inexpensive Disks (RAID) is used. The RAID can be classified into a hardware RAID to be executed by dedicated hardware and a software RAID with which a CPU performs processing relating to the RAID. In the case of the software RAID, a parity (redundancy code) is calculated by using the main memory. Therefore, in the case where the crash of the operating system occurs before the parity is written to the storage, there is a risk of damaging the redundancy due to a loss of the parity. Accordingly, there is a demand for a technology for restoring the parity to the storage in the case where the crash of the operating system occurs in a state where the parity is not written to the storage.

As explained above, there is a demand for restoring data to a storage even when an operating system crash occurs in a state where the data are not written into the storage.

BRIEF DESCRIPTION OF THE DRAWINGS

A general architecture that implements the various features of the embodiments will now be described with reference to the drawings. The drawings and the associated descriptions are provided to illustrate embodiments and not to limit the scope of the invention.

FIG. 1 is an exemplary block diagram illustrating an access path to a storage of an information processing apparatus according to a first embodiment.

FIG. 2 is an exemplary flowchart illustrating processing from starting the system to starting the OS.

FIG. 4 is an exemplary flowchart illustrating a flow of processing in the case of a crash.

FIG. 7 is an exemplary block diagram illustrating an access path to a storage of an information processing apparatus including a RAID subsystem to be realized by software according to a second embodiment.

DETAILED DESCRIPTION

Figure 3:
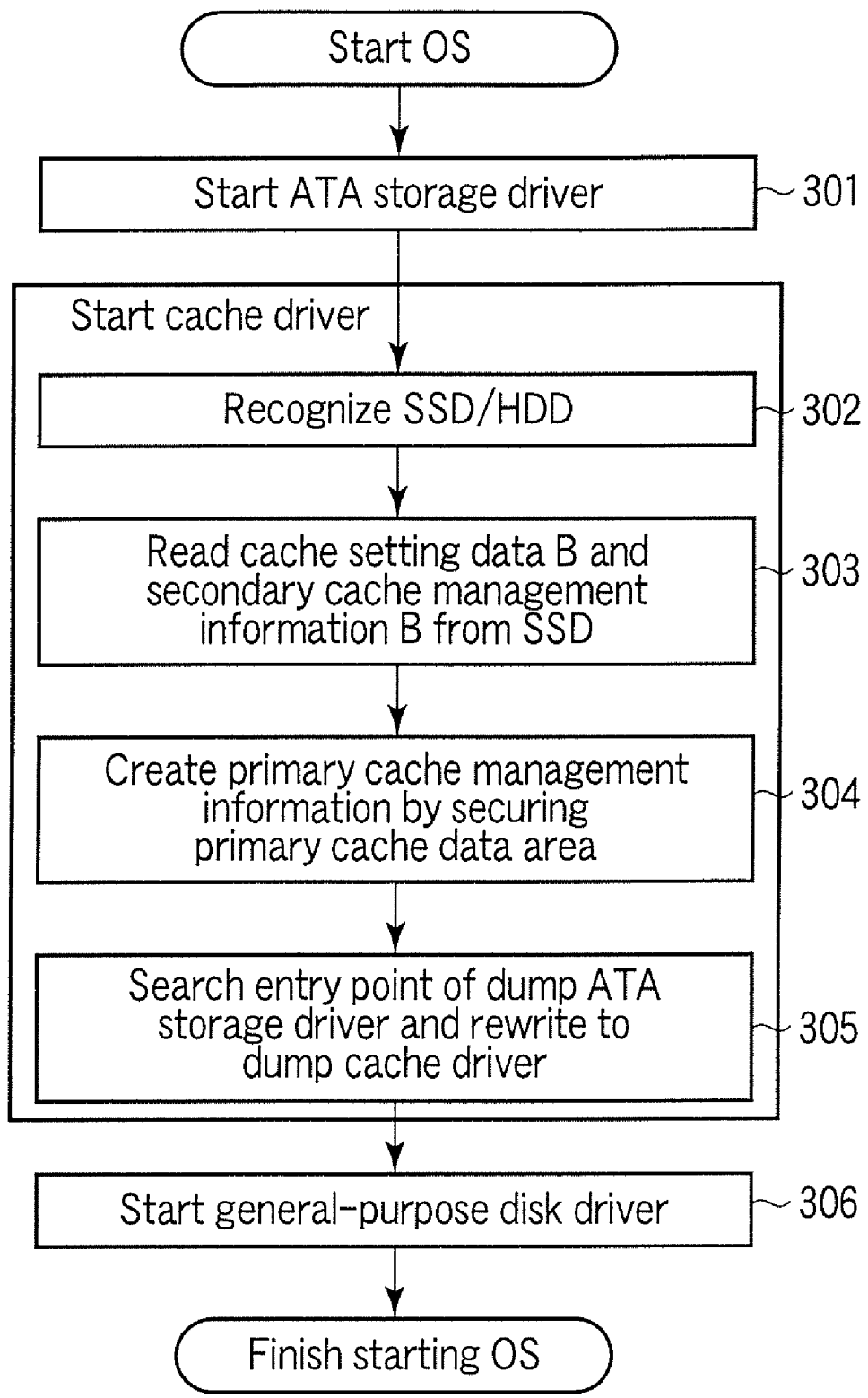
FIG. 3 is an exemplary flowchart illustrating a flow of processing of starting the operating system.

Various embodiments will be described hereinafter with reference to the accompanying drawings.

In general, according to one embodiment, an information processing apparatus includes a main memory, a first storage, a second storage, a first writing module, and a second writing module. A first storage is configured to store a file for executing an operating system. A first writing module is configured to write writing position information which indicates a writing position of data written in the second storage and is written to a predetermined position to the second storage, to the main memory. The second writing module is configured to write, to the first storage, the writing position information in the main memory to a predetermined write area in the first storage in a case of a crash of the operating system. The third writing module is configured to write the writing position information to the predetermined position in the second storage.

(First Embodiment)

FIG. 1 is a block diagram illustrating an access path to a storage of an information processing apparatus according to a first embodiment. The information processing apparatus is realized by a computer such as a personal computer and a server.

Shown in a software configuration illustrated in FIG. 1 are, from the left, the case of an ordinary operating system (OS) operation, the case of an operating system (OS) operation when a crash dump occurs, and the case of starting the operating system.

A computer includes an AT Attachment (ATA) storage controller 100, a hard disk drive (HDD) 110, a solid-state disk (SSD) 120, a main memory 130, and the like.

A part or a whole of the HDD 110 is used as a target area for caching 111, so that the SSD 120 and the main memory 130 are used as cache memories for an access to the HDD 110. The main memory 130 is used as a primary cache memory and the SSD 120 is used as a secondary cache memory. The main memory 130 is formed of a RAM which is a volatile memory.

The operating system (OS) 112 is stored in the target area for caching 111. A dump data write area 113 for writing memory dump data is preliminarily secured in the operating system 112. The operating system 112 does not necessarily need to exist in the target area for caching 111.

Cache setting data B121, secondary cache management information B122, and secondary cache data 123 are stored in the SSD 120. Though the SSD is used as a secondary cache device, the secondary cache device is not particularly limited to the SSD, and any storage may be used as long as the storage has a data transfer speed which is higher than the HDD 110. A storage position of the secondary cache management information B122 inside the SSD 120 is preliminarily decided.

Before starting the operating system 112, an expansion loader 163 performs secondary cache processing. The expansion loader 163 interprets a request made by an OS boot loader 162 and determines whether or not data requested by the OS boot loader 162 exist in the secondary cache data 123. In the case where it is determined that the data exist in the secondary cache data 123, the expansion loader 163 reads the data from the secondary cache data 123. In the case where it is determined that the data do not exist in the secondary cache data 123, the expansion loader 163 reads the data from the HDD 110.

During operation of the operating system 112, a cache driver 144 enters between a common disk driver 143 and an ATA storage driver 145 to perform management and control of the first cache data 134 secured on the main memory 130 and the secondary cache data inside the SSD 120. In the main memory 130, cache setting data A131, secondary cache management information A132, and primary cache management information 133 are stored.

The secondary cache management information A132 includes information of a position in the HDD 110 in which the secondary cache data 123 are written. The primary cache management information 133 includes information of a position in the HDD 110 in which the primary cache data 131 are written.

The cache setting data A131 and the secondary cache management information A132 are data which are obtained by expanding on the main memory 130 the cache setting data B121 and the secondary cache management information B122 which are read from the SSD 120 when the operating system 112 is started. During operating of the operating system 112, the cache setting data A131 and the secondary cache management information A132 are updated and managed on the main memory 130. When the operating system 112 is shut down, the cache setting data A131 and the secondary cache management information A132 inside the main memory are written in the SSD 120 as the cache setting data B121 and the secondary cache management information B122.

The primary cache data 134 and the primary cache management information 133 are valid only when the operating system 112 is in operation. The primary cache data 134 and the primary cache management information 133 are discarded after dirty data are written to the secondary cache or the HDD in the shut-down of the operating system 112.

In response to a read/write request from the common disk driver 143, the cache driver 144 appropriately issues a command or commands to each of or all of the primary cache data 134, the secondary cache data 123, and the HDD 110 to improve performance of the disk system.

In the case where the dump data of the main memory 130 are written to the HDD 110 after the crash of the operating system, a kernel dump writing module 151 in a kernel space of the operating system performs the processing. The kernel dump writing module 151 sends a write command to the dump ATA storage driver 153 in order that the dump data are written to the dump data write area 113 in the HDD 110. The dump ATA storage driver 153 writes the dump data to the HDD 110 via the ATA storage controller 100. The dump ATA storage driver 153 is the same as the ATA storage driver 145 at the time of normal operation but prepared as another entity in the kernel, so that it is possible to store the dump of the main memory 130 in the HDD 110 even in the case where the ATA storage driver 145 itself is the cause of the crash.

A dump cache driver 152 enters between a kernel dump writing module 151 which writes the dump of the main memory 130 in the case of crash and the dump ATA storage driver 153 to write the cache data. The dump cache driver 152 performs processing of writing the dump data received from the kernel dump writing module 151. This processing is performed in the case where data of the dump data write area 113 exist in the secondary cache management information 132 and the primary cache management information 133 and in order to delete the information.

After the writing of the dump data is finished, the dump cache driver 152 performs processing of writing the cache data to the cache data write area 114 inside the HDD 110. To the cache data write area 114, the cache setting data A131, the secondary cache management information 132, the primary cache data 134, and the primary cache management information 134 which are secured on the main memory 130 by the cache driver 144 operating at the normal operation are written.

Since the kernel dump writing module 151 and the dump ATA storage driver 153 are assumed to access only the HDD 110 in which the dump data write area 113 exists, the dump cache driver 152 cannot access the SSD 120. Accordingly, the cache data write area 114 is secured on the HDD 110 on which the dump data write area 113 is secured.

In the case where the expansion loader 163 detects a failure in normal shut-down after the crash dump and before starting the operating system, a restoration tool 661 is started. The restoration tool 661 restores data in the target area for caching 111 from the cache data write area 114 in the HDD 110 and the secondary cache data 123 in the SSD 120.

Processing from starting the system to starting the OS will be described with reference to a flowchart of FIG. 2. In the flowchart of FIG. 2, a part of an ordinary processing is omitted.

A system BIOS starts the expansion loader 163 before starting the operating system 112 (Step 201). The expansion loader 163 determines whether or not a crash occurs based on the cache setting data B121 stored in the SSD 120 (Step 202). In the case where it is determined that the startup is after the crash (Yes in Step 202), the expansion loader 163 starts the restoration tool 161. In the case where it is determined that the startup is normally performed and is not after the crash (No in Step 202), the expansion loader 163 starts the OS boot loader 162. Every time the OS boot loader 162 reads and writes data required for starting the operating system 112, the expansion loader 163 determines whether or not the data exist in the secondary cache data 123 in the SSD 120. The expansion loader 163 reads and writes the data from the secondary cache data 123 in the SSD 120 in the case where the data exist in the secondary cache data 123 or reads and writes the data from the HDD 110 in the case where the data do not exist in the secondary cache data 123. Foregoing is the description of the processing from starting the system to starting the OS.

Hereinafter, a flow of processing when the operating system 112 is started will be described with reference to a flowchart of FIG. 3. In the flowchart of FIG. 3, a part of an ordinary processing is omitted.

The driver is started in the order from a layer close to the hardware. After the ATA storage driver 145 is started (Step 301), the cache driver 144 is started.

When the cache driver 144 is started, the cache driver 144 recognizes the SSD 120 and the HDD 110 (Step 302). The cache driver 144 then expands the cache setting data B121 and the secondary cache management information B 132 from the SSD 120 to the main memory 130 (Step 303).

Subsequently, the cache driver 144 secures an area for storing the primary cache data 134 in the main memory 130 and then creates the primary cache management information 134 (Step 304). Subsequently, the cache driver 144 searches an entry point of the dump ATA storage driver 153 to rewrite the entry point of the dump ATA storage driver 153 to that of the dump cache driver 152 (Step 305). The original entry point is stored to be used in the case of a crash. After the cache driver is started, the common disk driver 143 is started (Step 306). Foregoing is the description of the flow of the processing in the case where the operating system 112 is started.

Hereinafter, a flow of processing in the case of a crash will be described with reference to a flowchart of FIG. 4. In the case where a crash of the system occurs, the kernel dump writing module 151 and the dump cache driver 152 are started in this order (Step 401). The dump ATA storage driver 153, not the dump cache driver 152, has been started in the conventional technologies, but the dump cache driver 152 is started in the present system since the entry point of the dump ATA storage driver 153 is rewritten to the dump cache driver 152.

The dump cache driver 152 uses the stored entry point to start the dump ATA storage driver 153 (Step 402). A function pointer is sent from the dump ATA storage driver 153 to the dump cache driver 152 (Step 403). The function pointer includes a function for opening a dump device, a function for writing dump data, a function for closing the dump device, and the like. The dump cache driver 152 stores the function pointer (Step 404) and sends a function point thereof which corresponds to the function pointer to the kernel dump writing module 151 (Step 405). The dump device is a device in which the dump write area exists and means the HDD 110.

Subsequently, the kernel dump writing module 151 calls the function for opening the dump device (Step 406). The dump cache driver 152 calls a corresponding function of the dump ATA storage driver 153 (Step 407). When the opening of the dump device is finished, writing of the dump data is started.

When the kernel dump writing module 151 calls a write routine of the dump cache driver 152 (Step 408), the dump cache driver 152 calls a write routine of the dump ATA storage driver 153 (Step 409). When the call is finished, the dump cache driver 152 confirms whether or not data corresponding to the primary cache management information 134 and the secondary cache management information A132 exist in the main memory 130. In the case where the data exist, the kernel dump writing module 151 invalidates the data (Step 410). The kernel dump writing module 151 repeats the processing until the entire dump data are written to the HDD 110.

When the writing of the dump data is finished, the kernel dump writing module 151 calls the dump cache driver 152 for the device close function in order to perform the closing of the dump device (Step 411). The dump cache driver 152 generates cache data to be written when the device close function is called (Step 412). The date to be written are the cache setting data A131, the primary cache data 134, the primary cache management information 134, and the secondary cache management information 132 exiting on the main memory 130, but in the case where there are data indicating a position by a pointer, for example, it is necessary to convert the position into a relative position from the leading position and the like.

Subsequently, the dump cache driver 152 uses a write function of the dump ATA storage driver 153 to write the cache data to the cache data write area 114 on the HDD 110 (Step 413). The write function of the dump ATA storage driver 153 is repeatedly called until all the cache data are written. When the writing is finished, the close function is called from the dump ATA storage driver 153 to finish the dump data writing (Step 414). Foregoing is the description of the flow of the processing in the case of crash.

Figure 5:
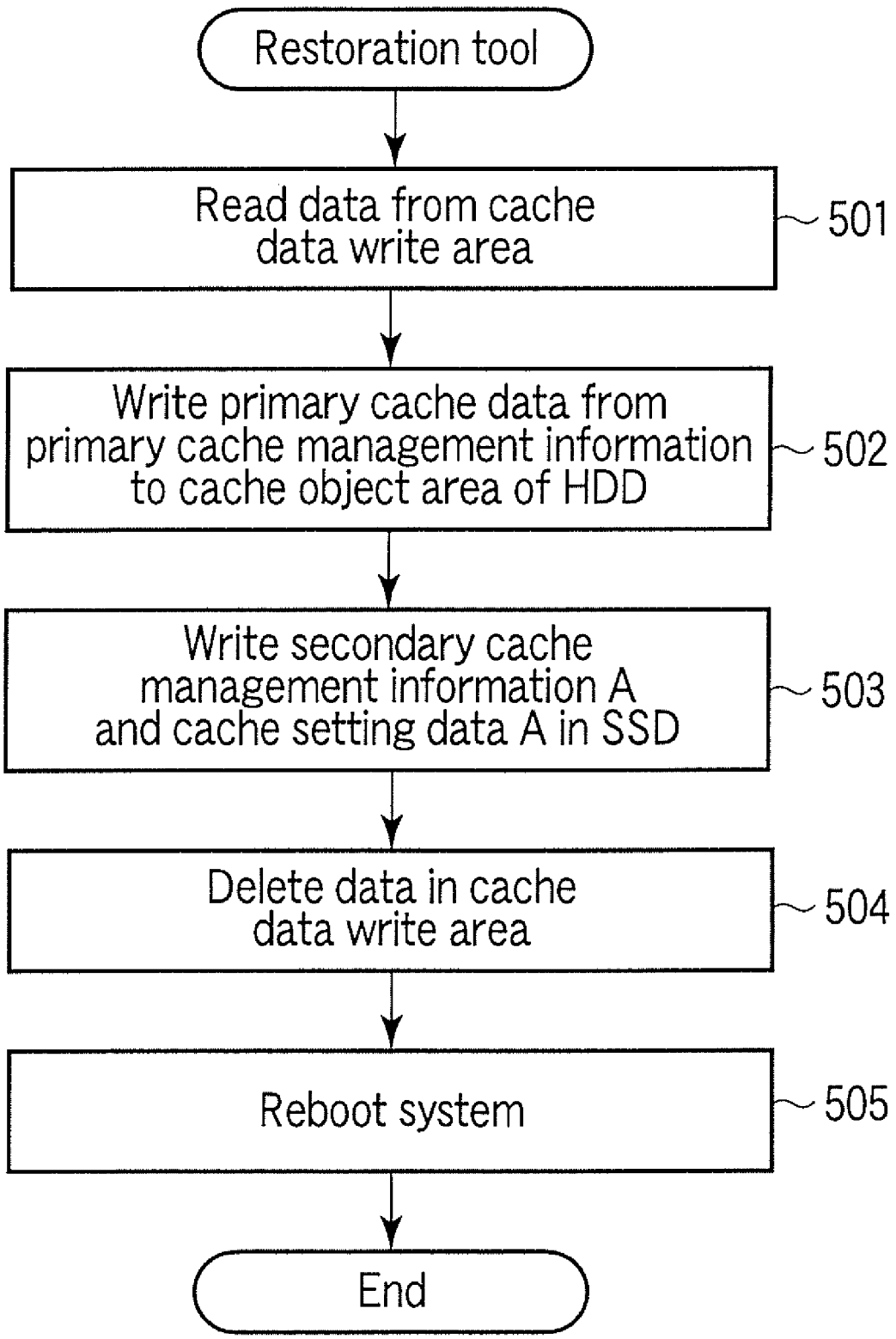
FIG. 5 is an exemplary flowchart illustrating a flow of processing by a restoration tool.

Hereinafter, a flow of processing by the restoration tool will be described with reference to a flowchart of FIG. 5. In the flowchart of FIG. 2, in the case where it is determined that a crash of the expansion loader 163 occurs (Yes in Step 202), the restoration tool 161 is started (Step 205). The restoration tool 161 performs processing of restoring the cache setting data B121, the secondary cache management information B 132, and the secondary cache data 123 from cache data written to the HDD 110.

When the restoration tool 161 is started, the cache data written by the dump cache driver 152 are read from the cache data write area 114 of the HDD 110 (Step 501). Subsequently, the restoration tool 161 writes the primary cache data 134 to the corresponding target area for caching 111 on the HDD 110 from the primary cache management information 134 which are read from the cache data write area 114 (Step 502). Further, the restoration tool 161 writes the secondary cache management information A132 and the cache setting data A131 read from the cache data write area 114 to the SSD 120 as the secondary cache management information B 132 and the cache setting data B121 (Step 503). The cache setting data B121 are written to a predetermined position. The restoration tool 161 deletes the data in the cache data write area 114 (Step 504). Finally, the restoration tool 161 reboots the system.

Even when a system crash occurs, the above-described processing can prevent a loss of the data which are cached and not written to the HDD 110.

(Second Embodiment)

A failure to normally shut down an operating system can be a significant problem which causes a data loss also in a software RAID.

For example, a case of updating data D00 into D00' in an array of a RAID 5 formed of three HDDs is considered. Here, the data D00 exists on the HDD 0, the data D01 exits on the HDD 1, and a parity P0 corresponding to the data D00 and D01 exists on the HDD 2. Also, P0=D00xorD01 is satisfied (xor represents exclusive OR). Data update in the RAID 5 involves update of the corresponding parity. In short, it is necessary to update the parity P0 corresponding to D00 to a parity P0' corresponding to D00' (=D00'xorD01).

When a system crash occurs after issuance of a command for writing the data D00' and the parity P0' in a state where only the writing of the parity P0' is finished, the data D00 are not updated to the data D00' to cause a state that the data and the parity are not consistent with each other. Here, in the case where the HDD 1 is broken down, P0'xorD00≠D01 is satisfied to disable restoration of correct data, thereby causing the data loss. Hereinafter, a system which avoids the above-described problem in the case of a system crash will be described.

Figure 6:
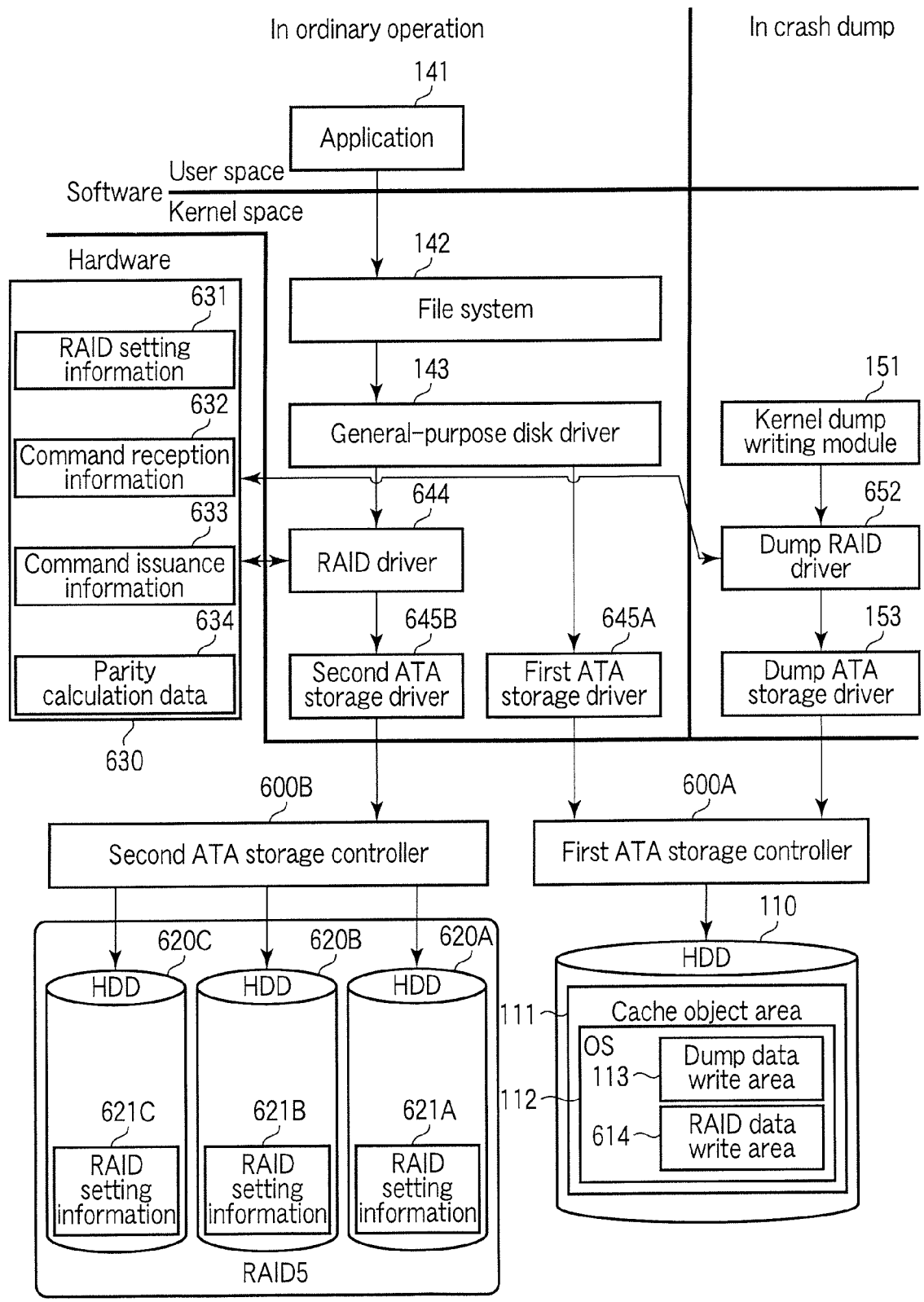
FIG. 6 is an exemplary block diagram illustrating an access path to a storage of an information processing apparatus including a RAID subsystem to be realized by software according to a second embodiment.

FIG. 6 is a block diagram illustrating an access path to a storage of an information processing apparatus having a RAID subsystem to be realized by software according to the second embodiment. The information processing apparatus is realized by a computer such as a personal computer and a server.

An HDD 110 to which an operating system 112 is installed is connected to a first ATA storage controller 600A. In the HDD 110, a dump data write area 113 and a RAID data write area exist. The first ATA storage controller 600A is controlled by a first ATA storage driver 645A. To a second ATA storage controller 600B, three HDDs 620A, 620B, and 620C are connected. By a RAID driver 644 which is positioned above a second ATA storage driver 645B and controls the second ATA storage controller 600B, the three HDDs 620A, 620B, and 620C are controlled as an array of the RAID 5. RAID setting information 621A, 621B, and 621C are respectively stored in the three HDDs 620A, 620B, and 620C. The RAID driver 644 forms the array based on the RAID setting information 621A, 621B, and 621C on starting. The RAID setting information 621A, 621B, and 621C are written at positions set in the HDDs 620A, 620B, and 620C.

The RAID driver 644 stores RAID setting information 631, command reception information 632, command issuance information 633, and parity calculation data 634 on the main memory 630. The RAID driver 644 uses the RAID setting information 631, the command reception information 632, the command issuance information 633, and the parity calculation data 634 to realize a function of the RAID.

When an application 141 performs read/write on a file, a file system 142 issues commands corresponding to the RAID driver 644 and the first ATA storage driver 645A via a common disk driver 143. A kernel dump writing module 151 is started when the crash occurs and, like the case described by using FIG. 1, a dump RAID driver 652 enters between the dump ATA storage driver 153 and the kernel dump writing module 151, thereby making it possible to write the RAID setting information 631, the command reception information 632, the command issuance information 633, and the parity calculation data 634 in a RAID data write area 614 in the HDD 110.

Illustrated in FIG. 7 is an access path to the storage before starting the OS. An expansion loader 663 realizes the function of the RAID. In the case where a request from an OS boot loader 162 is made to the RAID, the expansion loader 663 issues appropriate commands to the HDDs 620A, 620B, and 620C connected to the second ATA storage controller 600B. Int13h routines 664A and 664B are nested. The Int13h routines 664A and 664B perform processing in the case of recognizing the commands as those issued to the HDD working under the routines 664A and 664B.

Also, in the case where the expansion loader 663 determines that startup is performed after the crash, a restoration tool 661 is started. The restoration tool 661 reads RAID setting information, command reception information, command issuance information, and parity calculation data from the RAID data write area 614. The restoration tool 661 detects the command under processing, writes correct data, deletes the data in the RAID data write area, and reboots the system.

As described above, it is possible to restore the data in the main memory 630 to the set positions of the HDDs 620A, 620B, and 620C even in the case where the crash of the operating system occurs in the state where the parity which is not written to the HDDs 620A, 620B, and 620C is in the main memory 630.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a main memory;
a first storage configured to store a file for executing an operating system;
a second storage;
a first writing module configured to write, to the main memory, writing position information which indicates a writing position of data written to the second storage and is written to a predetermined position in the second storage;
a second writing module configured to write the writing position information in the main memory to a predetermined write area in the first storage in case of a crash of the operating system; and
a third writing module configured to write the data in the first storage to the second storage based on the writing position information in the first storage in case of startup after the crash.

2. The apparatus of claim 1, wherein the third writing module is configured to write the writing position information to the predetermined position in the second storage in case of startup after the crash.

3. The apparatus of claim 1, wherein
the first writing module comprises a cache module configured to use the main memory and the second storage as cache memories for an access to the first storage,
the cache module is configured to use the main memory as a cache of a higher level than the second storage, to cache first cache data to the main memory, to record first cache management information including information indicating a writing position in the first storage of the first cache data, to cache second cache data to the second storage, and to write, to the main memory and the second storage, second cache management information including information indicating a writing position in the first storage of the second cache data,
the second writing module is configured to write the first cache data, the first cache management information, and the second cache management information in the main memory to a cache data write area in the first storage in case of the crash of the operating system, and
the third writing module is configured to write the first cache data in the first storage based on the first cache management information in the first storage and to write the second cache management information to the second storage in case of the startup after the crash.

4. The apparatus of claim 3, further comprising a dump data writing module configured to write dump data of the main memory to the first storage in case of the crash of the operating system.

5. The apparatus of claim 3, wherein
the cache module is configured to record, in the main memory, cache setting information comprising settings for using the main memory and the second storage as the cache memories,
the first writing module is configured to write the cache setting information in the main memory to the cache data write area, and
the second writing module is configured to write the cache setting information in the cache data write area to the second storage.

6. The apparatus of claim 3, wherein the first writing module and the second writing module are software executed by a processor.

7. The apparatus of claim 3, wherein
the first storage comprises a hard disk drive (HDD), and
the second storage comprises a solid-state drive (SSD).

8. The apparatus of claim 1, wherein
the second storage comprises a plurality of third storages,
the first writing module comprises a data redundancy module configured to write data in a distributed manner to fourth storages which are part of the third storages, to write a redundancy code, which is generated from the data in the distributed manner, to a fifth storage different from the fourth storages in the third storages, to generate the redundancy code in the main memory, and to store setting information including information indicating a writing position in the fifth storage of the redundancy code to the main memory,
the second writing module is configured to write the redundancy code and the setting information in the main memory to a data write area of the first storage in case of the crash of the operating system, and
the third writing module is configured to write the redundancy code in the first storage to the fifth storage based on the setting information in the third storage and to write the setting information in the first storage to the plurality of third storages in case of the startup after the crash.

9. The apparatus of claim 8, wherein the redundancy module, the first writing module, the second writing module, and the fourth writing module are software executed by a processor.

10. A data restoration method for an information processing apparatus comprising a main memory, a first storage configured to store a file for executing an operating system, and a second storage, the method comprising:
writing data to be written to the second storage to the main memory;
writing writing position information indicating a position in the second storage at which the data is written to a predetermined position in the second storage, to the main memory;
writing the data and the writing position information in the main memory to a write area in the first storage in case of a crash of the operating system; and
writing the data in the first storage to the second storage based on the writing position information in the first storage in case of startup after the crash.

11. The method of claim 10, further comprising: writing the writing position information to the predetermined position in the second storage in case of startup after the crash.

12. The method of claim 10, further comprising:
using the main memory and the second storage as cache memories for an access to the first storage;
using the main memory as a cache of a higher level than the second storage;
caching first cache data to the main memory;
recording first cache management information including information indicating a writing position in the first storage of the first cache data;
caching second cache data to the second storage;
writing second cache management information including information indicating a writing position in the first storage of the second cache data to the main memory and the second storage;
writing the first cache data, the first cache management information, and the second cache management information in the main memory to a cache data write area in the first storage in case of the crash of the operating system; and
writing the first cache data to the first storage based on the first cache management information in the first storage and writing the second cache management information to the second storage in case of the startup after the crash.

13. The method of claim 12, further comprising writing dump data of the main memory to the first storage in case of the crash of the operating system.

14. The method of claim 12, further comprising:
recording, in the main memory, cache setting information comprising settings for using the main memory and the second storage as the cache memories;
writing the cache setting information in the main memory to the cache data write area; and
writing the cache setting information in the cache data write area to the second storage.

15. The method of claim 12, wherein
the first storage comprises a hard disk drive (HDD), and
the second storage comprises a solid-state drive (SSD).

16. The method of claim 10, wherein
the second storage comprises a plurality of third storages,
the method further comprises
writing data in a distributed manner to fourth storages which are part of the third storages,
writing a redundancy code, which is generated from the data in the distributed manner, to a fifth storage different from the fourth storages in the third storages,
generating the redundancy code in the main memory,
storing setting information including information indicating a writing position in the fifth storage of the redundancy code in the main memory,
writing the redundancy code and the setting information in the main memory to a data write area of the first storage in case of the crash of the operating system,
writing the redundancy code in the first storage to the fifth storage based on the setting information in the plurality of third storages, and
writing the setting information in the first storage to the plurality of third storages.

* * * * *